United States Patent
Taniguchi et al.

(10) Patent No.: US 12,301,080 B2
(45) Date of Patent: May 13, 2025

(54) MOTOR SYSTEM

(71) Applicant: DENSO CORPORATION, Kariya (JP)

(72) Inventors: Makoto Taniguchi, Kariya (JP); Yuuko Ohtani, Nagakute (JP); Shinya Urata, Nagakute (JP); Hideo Nakai, Nagakute (JP); Kenji Hiramoto, Nagakute (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 17/990,946

(22) Filed: Nov. 21, 2022

(65) Prior Publication Data

US 2023/0079383 A1 Mar. 16, 2023

Related U.S. Application Data

(63) Continuation of application No. PCT/JP2021/019423, filed on May 21, 2021.

(30) Foreign Application Priority Data

May 22, 2020 (JP) ................................. 2020-089326

(51) Int. Cl.
*H02P 21/00* (2016.01)
*H02K 1/27* (2022.01)
(Continued)

(52) U.S. Cl.
CPC ............... *H02K 17/12* (2013.01); *H02K 1/27* (2013.01); *H02K 3/04* (2013.01); *H02P 21/0089* (2013.01);
(Continued)

(58) Field of Classification Search
CPC .. H02K 1/27; H02K 3/04; H02P 25/08; H02P 27/06; H02P 21/0089; H02P 25/022; H02P 2201/07
See application file for complete search history.

(56) References Cited

U.S. PATENT DOCUMENTS 6,831,442 B2 * 12/2004 Hsu ..................... H02M 7/5387
                                                                   318/803
10,967,743 B2 * 4/2021 Ge ........................... H02P 27/06
(Continued)

FOREIGN PATENT DOCUMENTS

| JP | 2006-248389 A | 9/2006 |
|----|---------------|--------|
| JP | 2011-061998 A | 3/2011 |

(Continued)

OTHER PUBLICATIONS

Noguchi "Torque Boost Operation of New Consequent-Pole Permanent Magnet Motor Using Zero-Phase Circuit", 2019, IEEE, 1-6 (Year: 2019).*

(Continued)

*Primary Examiner* — Bickey Dhakal
(74) *Attorney, Agent, or Firm* — Oliff PLC

(57) ABSTRACT

A motor system of the present disclosure includes a permanent magnet motor including a stator having N-phase windings and a rotor having a permanent magnet, N being a natural number greater than or equal to three, an inverter that supplies N-phase drive currents for generating a rotating magnetic field to the stator, and a zero-phase current supply unit that supplies a zero-phase current to the N-phase windings of the stator. The motor system applies the zero-phase current to the N-phase windings in response to an inter-terminal voltage of the permanent magnet motor reaching a predetermined value of the inter-terminal voltage.

14 Claims, 11 Drawing Sheets

(51) Int. Cl.
     *H02K 3/04*          (2006.01)
     *H02K 17/12*        (2006.01)
     *H02P 25/022*      (2016.01)

(52) U.S. Cl.
     CPC ........ *H02P 25/022* (2013.01); *H02P 2201/07* (2013.01)

(56) References Cited

U.S. PATENT DOCUMENTS

| | | | |
|---|---|---|---|
| 2008/0278102 A1* | 11/2008 | Taniguchi | H02P 31/00 318/400.27 |
| 2015/0015169 A1* | 1/2015 | Yanagi | B60K 28/14 318/400.09 |
| 2021/0229735 A1* | 7/2021 | Kitamura | B62D 5/046 |

FOREIGN PATENT DOCUMENTS

| | | | |
|---|---|---|---|
| JP | 2016-042768 A | | 3/2016 |
| JP | 2016039679 A | * | 3/2016 |
| JP | 2019-170119 A | | 10/2019 |
| JP | 2019-193352 A | | 10/2019 |

OTHER PUBLICATIONS

Saeid Haghbin, "DC Bus Current Harmonics of a Three-phase PWM Inverter with the Zero Sequence Injection", 2014, IEEE (Year: 2014).*

* cited by examiner

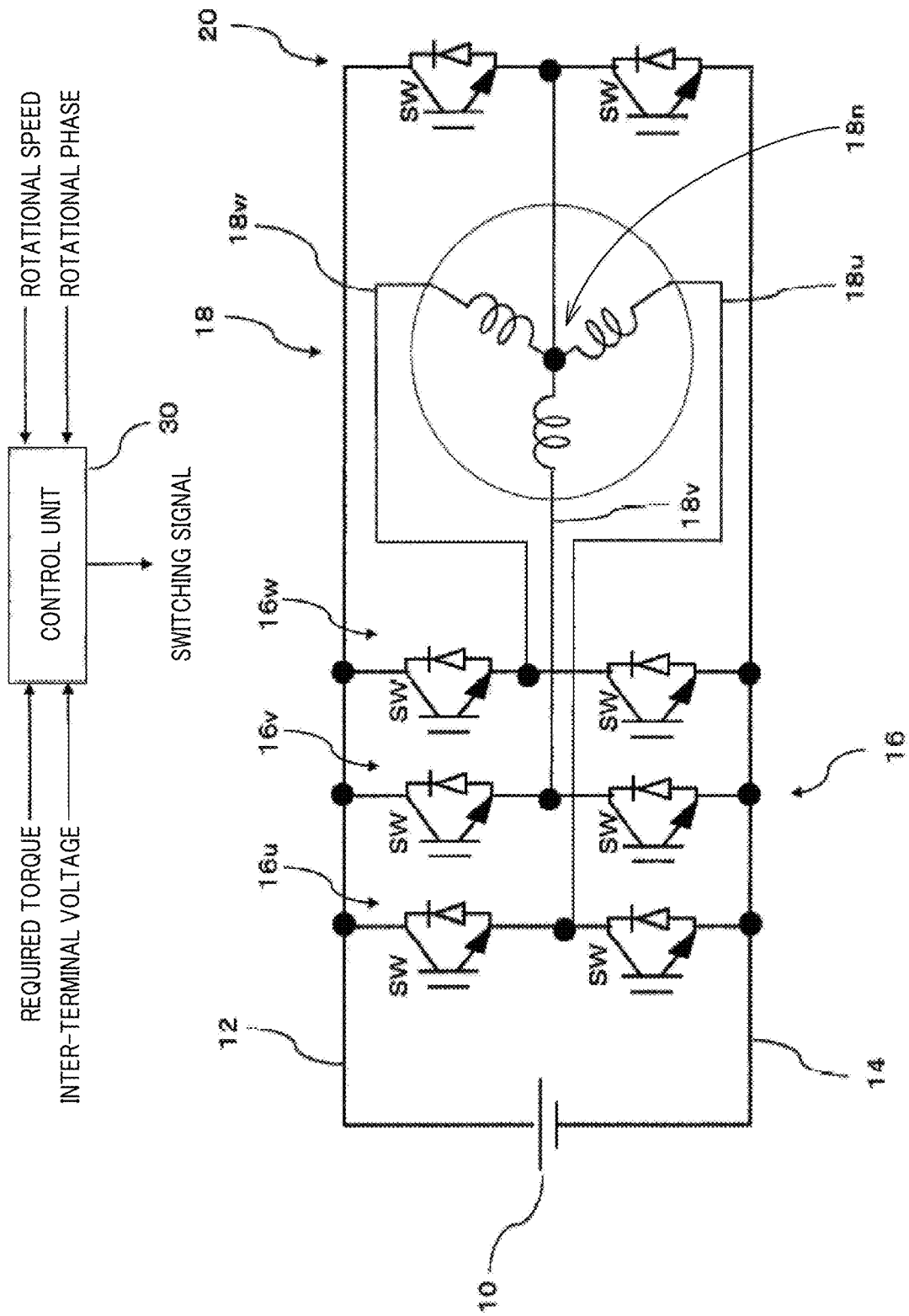

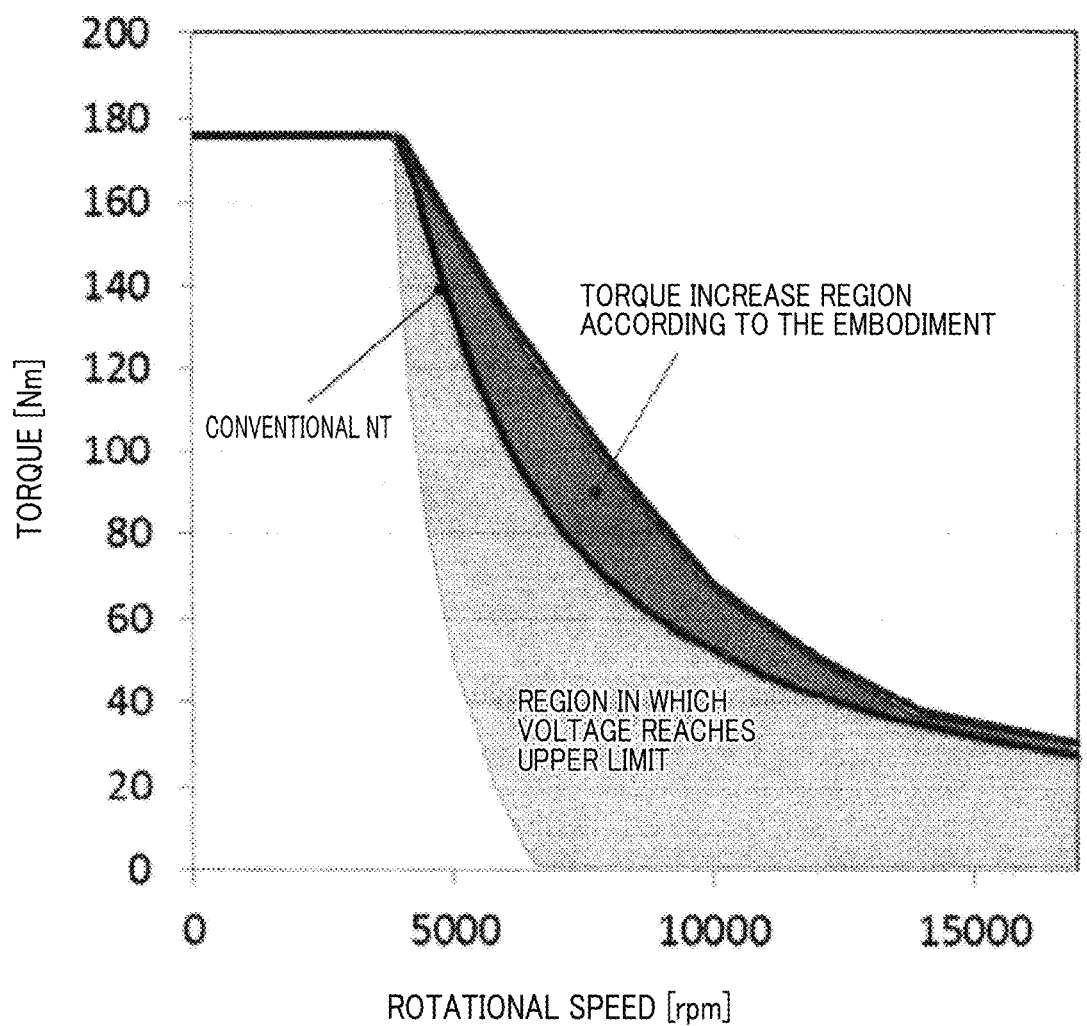

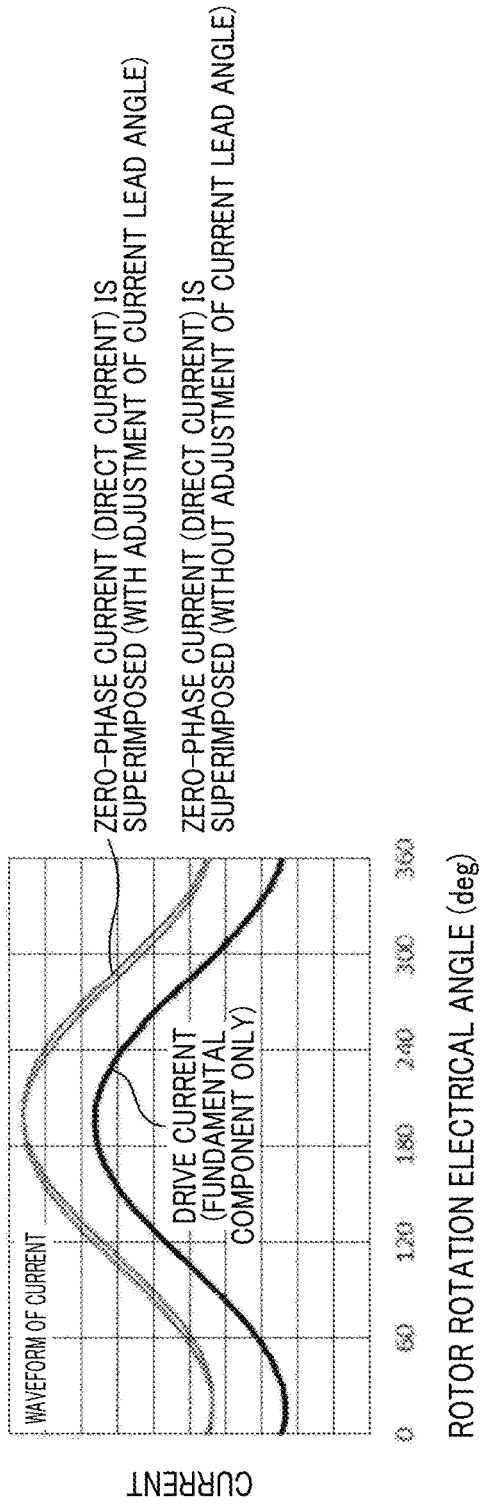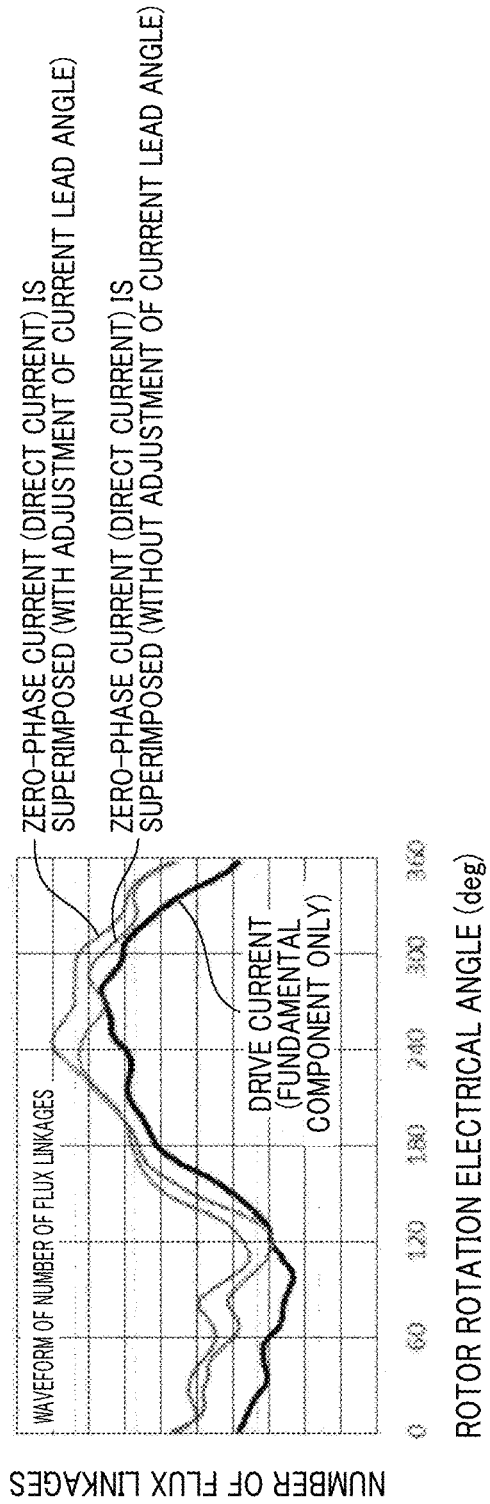

MOTOR SYSTEM

CROSS-REFERENCE TO RELATED APPLICATION

The present application is a continuation application of International Application No. PCT/JP2021/019423, filed on May 21, 2021, which claims priority to Japanese Patent Application No. 2020-89326, filed in Japan on May 22, 2020. The contents of these applications are incorporated herein by reference in their entirety.

BACKGROUND

1. Technical Field

The present disclosure relates to a motor system.

2. Related Art

In conventional motor systems of electric automobiles and hybrid automobiles, a desired alternating current is supplied from an inverter to a stator winding of a permanent magnet motor according to the required torque to drive the permanent magnet motor.

In such a motor system, when the rotational speed of a motor is increased, a smaller output torque is obtained. In order to address this concern, the motor system performs field weakening control for weakening the magnetic field of a permanent magnet. The field weakening control ensures the output torque of the motor even when the rotational speed of the motor is increased.

SUMMARY

The present disclosure provides a motor system. As one aspect of the present disclosure, a motor system in which a zero-phase current is applied to a winding of a stator includes at least a permanent magnet motor, an inverter, and a zero-phase current supply unit. The permanent magnet motor includes a stator having N-phase windings and a rotor having a permanent magnet, N being a natural number greater than or equal to three. The inverter supplies N-phase drive currents for generating a rotating magnetic field to the stator. The zero-phase current supply unit supplies a zero-phase current to the N-phase windings of the stator. The motor system applies the zero-phase current to the N-phase windings in response to an inter-terminal voltage of the permanent magnet motor reaching a predetermined value.

BRIEF DESCRIPTION OF THE DRAWINGS

In the accompanying drawings:

FIG. 1 is a diagram showing a configuration of an example of a motor system according to an embodiment;

FIG. 4 shows a relationship between a rotational speed and a torque (NT characteristic) of a motor;

FIG. 6A is a diagram showing a waveform of a current, when a zero-phase current that is a direct current is superimposed on a drive current including only a fundamental component;

FIG. 6B is a diagram showing a waveform of the number of flux linkages, when a zero-phase current that is a direct current is superimposed on a drive current including only a fundamental component;

DETAILED DESCRIPTION OF THE PREFERRED EMBODIMENTS

Figure 2A:
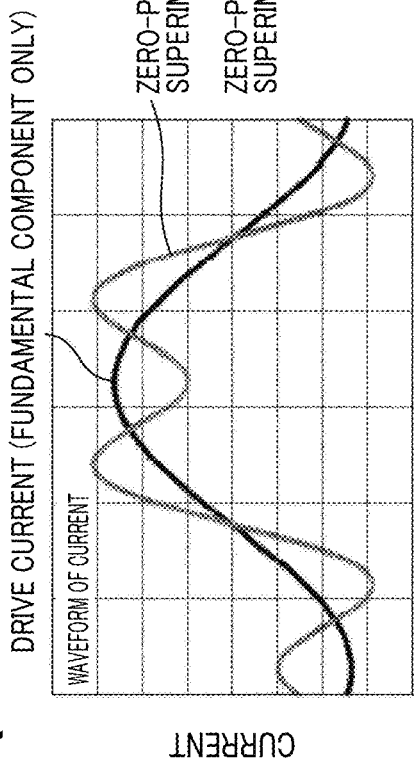
FIG. 2A is a diagram showing a waveform of a current, when a zero-phase current including a third harmonic component is superimposed on a drive current including only a fundamental component.

In a permanent magnet motor, a zero-phase current flows in addition to typical phase currents. For example, JP 2016-042768 A (hereinafter referred to as "Patent Literature 1") proposes to control the zero-phase current in addition to the phase currents. Specifically, Patent Literature 1 proposes a system in which a zero-phase current is controlled to cause a single inverter to control an electromagnetic force in the x-axis direction of a rotor generated for the rotor in order to reduce vibration of the rotor caused by the electromagnetic force.

In JP 2011-061998 A (hereinafter referred to as "Patent Literature 2"), a current supplied to a motor is controlled to cause a frequency component of a waveform of magnetic flux density distribution on a surface of a rotor to include at least a predetermined amount of third harmonic component when a fundamental waveform is a waveform for a single pair of magnetic poles of the rotor. Patent Literature 2 shows that this configuration improves the output and efficiency without increasing vibration or noise.

However, in the field weakening control described above, accurate control of the magnetic flux of a motor is difficult, and the control of the motor may become unstable.

In Patent Literature 1, a zero-phase current flowing through a neutral point of multi-phase windings is used to control a force in the radial direction generated for the rotor; however, this merely causes an outward force in the radial direction to act due to a magnetic flux generated by the zero-phase current, and cannot increase the torque.

In Patent Literature 2, the structures of a permanent magnet and a stator core are used to generate a harmonic component; thus, it is difficult to adjust the ratio between harmonic and fundamental components to be a predetermined ratio when the motor is driven.

An object of the present disclosure is to provide a motor system that increases an output torque of a motor by a relatively simple way.

A motor system of the present disclosure includes a permanent magnet motor including a stator having N-phase windings and a rotor having a permanent magnet, N being a natural number greater than or equal to three, an inverter that supplies N-phase drive currents for generating a rotating magnetic field to the stator, and a zero-phase current supply unit that supplies a zero-phase current to the N-phase windings of the stator. The motor system applies the zero-phase current to the N-phase windings in response to an inter-terminal voltage of the permanent magnet motor reaching a predetermined value.

The zero-phase current preferably has a frequency different from a frequency of a fundamental component of the drive currents.

The N-phase windings of the stator preferably have a Y-connection, and the zero-phase current is preferably supplied via a neutral point of the Y-connection.

The N-phase windings of the stator are independent of each other, and the inverter includes a first inverter and a second inverter that are independent of each other. The N-phase windings each have a first end and a second end. An output of the first inverter is connected to the first ends of the N-phase windings, and an output of the second inverter is connected to the second ends of the N-phase windings. Switching of the first inverter and the second inverter is preferably controlled to pass the zero-phase current through the N-phase windings.

The zero-phase current is applied to the N-phase windings to promote magnetic saturation of a stator core of the stator.

The inverter preferably further increases a fundamental current or adjusts a current lead angle.

The zero-phase current is preferably an Nth harmonic current (N is a natural number greater than or equal to three).

A DC voltage from a DC power supply is preferably supplied to the inverter via a power converter.

In the present disclosure, a current including a component different from the fundamental component of the drive current is applied as the zero-phase current to the motor to promote magnetic saturation of the stator to reduce the inter-terminal voltage of the motor, allowing the inter-terminal voltage to have a margin to the upper limit of the inter-terminal voltage, thus increasing the output torque.

An embodiment of the present disclosure will be described below with reference to the drawings. The present disclosure is not limited to the embodiment described below.

System Configuration

FIG. 1 is a diagram showing a configuration of an example of a motor system according to the embodiment. An inverter 16 is connected to a battery 10 which is a DC power supply.

Specifically, a positive bus bar 12 and a negative bus bar 14 of the inverter 16 are respectively connected to a positive electrode and a negative electrode of the battery 10.

The inverter 16 is a three-phase inverter, and includes three switching legs 16u, 16v, and 16w connected between the positive bus bar 12 and the negative bus bar 14. The switching legs 16u, 16v, and 16w are each composed of two switching elements SW connected in series between the positive bus bar 12 and the negative bus bar 14. The switching elements SW are each composed of a transistor such as an IGBT and a reverse flow diode connected in parallel.

Midpoints of the switching legs 16u, 16v, and 16w are output ends of the inverter 16. A U-phase wiring terminal 18u of a motor 18 having a Y-connection is connected to the midpoint of the switching leg 16u. A V-phase wiring terminal 18v of the motor 18 having a Y-connection is connected to the midpoint of the switching leg 16v. A W-phase wiring terminal 18w of the motor 18 having a Y-connection is connected to the midpoint of the switching leg 16w. Thus, drive currents having a phase difference of 120 degrees are supplied to three-phase windings of a stator of the motor 18.

The motor 18 is a permanent magnet motor including a stator having three-phase stator windings connected to the wiring terminals 18u, 18v, and 18w and a rotor having a permanent magnet with a predetermined number of poles. Three-phase drive currents are supplied from the inverter 16 to the stator. In this example, three-phase drive currents are supplied to the stator; however, N-phase drive currents (N is a natural number greater than or equal to three) may be supplied to the stator.

Furthermore, a switching leg 20 that is different from the switching legs 16u, 16v, and 16w is connected as a zero-phase current supply unit between the positive bus bar 12 and the negative bus bar 14. The switching leg 20 is composed of two switching elements SW connected in series, and a midpoint of the switching leg 20 is connected to a neutral point 18n of the motor 18.

In the motor system described above, a control unit 30 includes a microprocessor, a memory, and the like, and controls switching of the inverter 16 to supply alternating currents having a phase difference of 120 degrees to the phase windings of the stator, allowing a rotating magnetic field to be generated to rotationally drive the motor.

For example, in the case where the motor 18 is a drive motor of an electric vehicle, a required torque which is an output requirement of the motor 18 is determined, for example, from the accelerator position of the vehicle, and data on the required torque is supplied to the control unit 30. Furthermore, data on a detected rotational speed of the motor 18 and data on a detected rotational phase of the motor 18 are supplied to the control unit 30. The control unit 30 generates a switching signal for the inverter 16 by a known technique such as vector control, and controls switching of the inverter 16 using the switching signal.

In the present embodiment, the switching elements SW of the switching leg 20 make it possible to supply, to the neutral point 18n of the motor 18, a zero-phase current having a frequency different from that of a fundamental drive current (fundamental component) applied to the motor to drive the motor.

The zero-phase current in this case may be a harmonic current different from the fundamental drive current, a direct current different from the drive current, or the like. When the zero-phase current is a direct current, instead of the switching leg 20, a capacitor or a battery may be connected to the neutral point 18*n*. At least one of the capacitor and the battery has a predetermined voltage.

The control unit 30 monitors an inter-terminal voltage of the phases of the motor 18, and supplies a zero-phase current to the motor 18 when the inter-terminal voltage reaches a predetermined value (a predetermined upper limit of the inter-terminal voltage). This configuration allows a zero-phase current to be supplied to the motor, for example, in order to enable the motor system to obtain a desired torque when the rotational speed of the motor is high and the desired torque is not obtained by merely applying only a drive current (fundamental current) to the motor. In this case, a timing for starting the supply of zero-phase current to the motor is preferably the same as a timing for starting field weakening control (control in which the lead angle of a drive current (current lead angle) with respect to the position of a rotor is increased to reduce a magnet magnetic flux by a d-axis current magnetic flux) for a conventional motor.

Superimposition of Third Harmonic Current

Figure 2B:
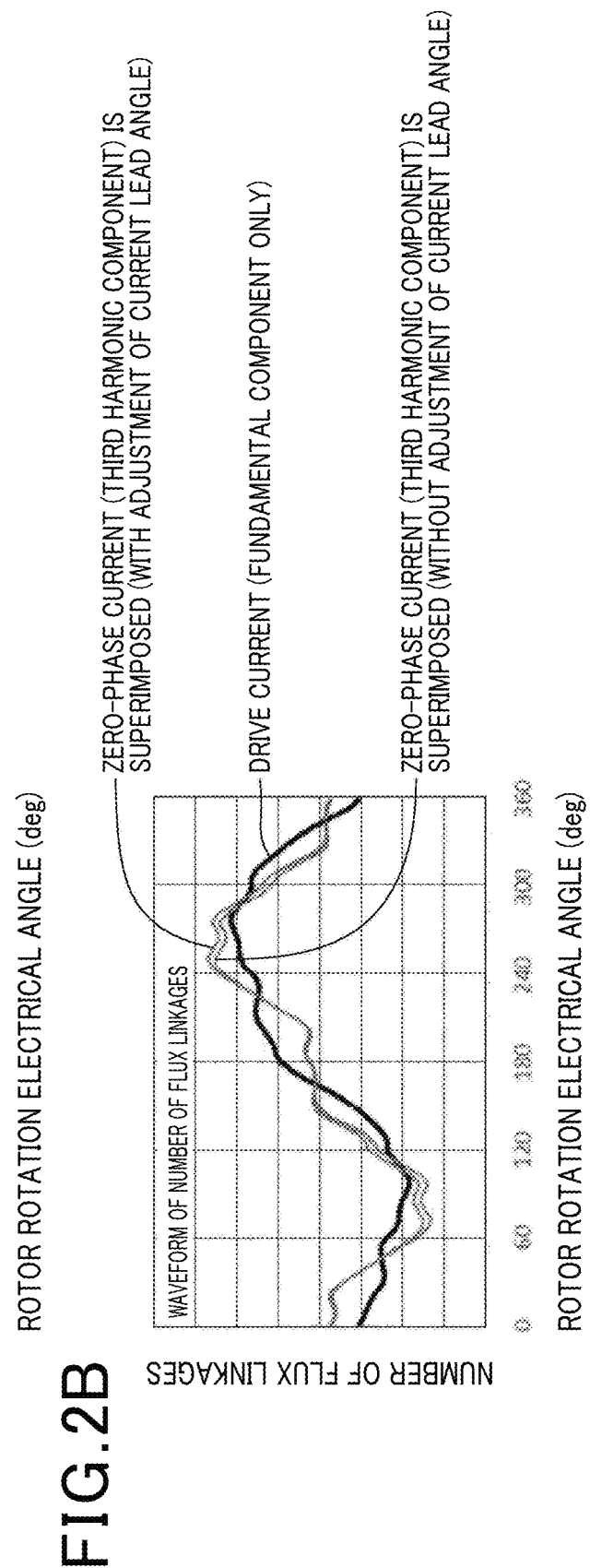
FIG. 2B is a diagram showing a waveform of the number of flux linkages, when a zero-phase current including a third harmonic component is superimposed on a drive current including only a fundamental component.

As described above, the zero-phase current may be an Nth harmonic current (N is a natural number greater than or equal to three). FIG. 2A is a diagram showing a waveform of the current, when a zero-phase current including a third harmonic component is superimposed on a drive current including only a fundamental component. FIG. 2B is a diagram showing a waveform of the number of flux linkages, when a zero-phase current including a third harmonic component is superimposed on a drive current including only a fundamental component. Thus, when the third harmonic current is superimposed on the fundamental current, the waveform of the current has a plurality of distributed peaks, and the waveform of the number of flux linkages is less expanded to reduce the variation in the number of flux linkages. The waveform of the current is approximately the same irrespective of adjustment of the current lead angle.

Figure 3A:
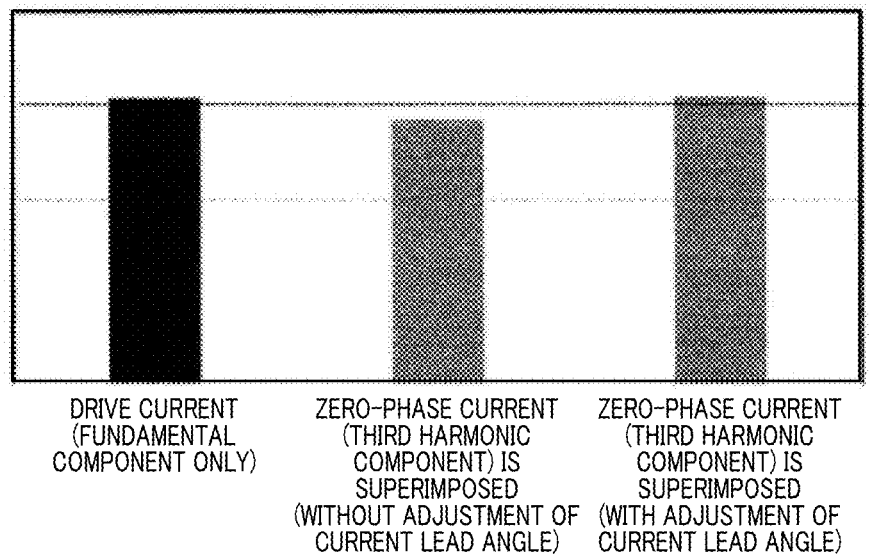
FIG. 3A is a diagram showing an amplitude of a fundamental component of the number of flux linkages, when a zero-phase current including a third harmonic component is superimposed on a drive current including only a fundamental component.
Figure 3B:
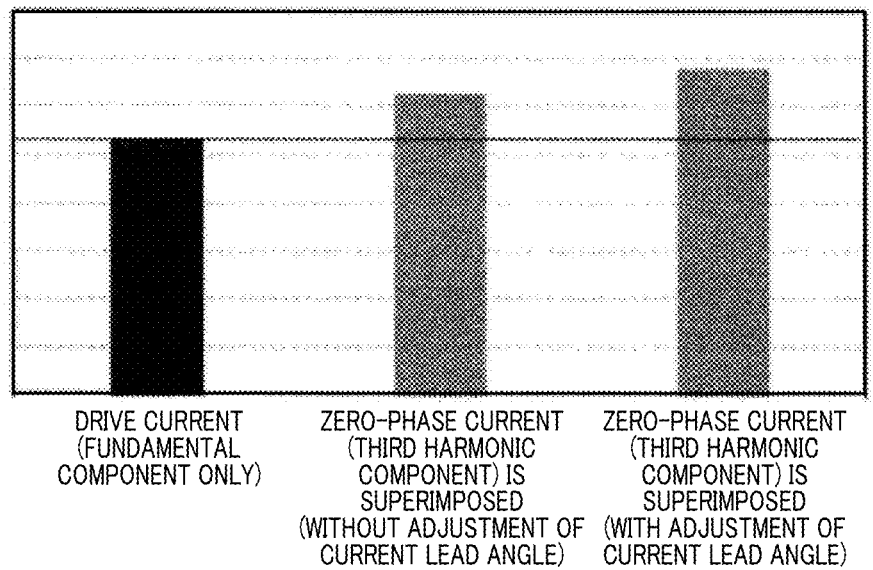
FIG. 3B is a diagram showing a torque, when a zero-phase current including a third harmonic component is superimposed on a drive current including only a fundamental component.

FIG. 3A is a diagram showing an amplitude of a fundamental component of the number of flux linkages, when a zero-phase current including a third harmonic component is superimposed on a drive current including only a fundamental component. FIG. 3B is a diagram showing a torque, when a zero-phase current including a third harmonic component is superimposed on a drive current including only a fundamental component. Thus, by superimposing the third harmonic current on the fundamental current, the variation in the number of flux linkages is reduced, and when no adjustment of the current lead angle is performed, the amplitude of the fundamental component is reduced, allowing a margin to the upper limit of the inter-terminal voltage. Therefore, the output torque is increased as compared with the case where only the fundamental current is used. Furthermore, when adjustment of the current lead angle of the fundamental current is performed, the amplitude of the fundamental component of the number of flux linkages for the drive current can be equivalent to the amplitude of the fundamental component of the number of flux linkages for the fundamental current, thus further increasing the output torque. Thus, the margin to the upper limit of the inter-terminal voltage is generated by superimposing the zero-phase current including a third harmonic component on the drive current presumably because the superimposition of the third harmonic current on the fundamental current promotes magnetic saturation of a stator core of the stator at the peak of the number of flux linkages, increasing the magnetic reluctance of the stator core, thus making it difficult to pass a fundamental magnetic flux through the stator core.

As described above, in the present embodiment, when the inter-terminal voltage of the motor reaches a voltage close to the upper limit, the zero-phase current including a third harmonic component is superimposed on the drive current. This promotes the magnetic saturation of the stator core, increasing the magnetic reluctance of the stator core, thus making it difficult to pass a fundamental magnetic flux through the stator core. This reduces the fundamental component of the coil voltage, leading to a reduction in the inter-terminal voltage (also referred to as a line voltage) of the motor. When the line voltage of the motor has a margin to the upper limit of the input DC voltage of the inverter input from the DC power supply, it is usually unnecessary to perform field weakening (increase the current lead angle to reduce the magnet magnetic flux by the d-axis current magnetic flux). Furthermore, when the current lead angle of the fundamental current is reduced to increase the fundamental magnetic flux until the line voltage reaches the upper limit, the d-axis inductance is increased because the magnet magnetic flux is not cancelled out by the d-axis current magnetic flux, thus increasing the torque. That is, the torque can be increased by increasing the current supplied from the inverter to the motor.

FIG. 4 shows a relationship between the rotational speed and the torque (NT characteristic) of the motor. Thus, when the rotational speed is increased, the line voltage reaches the upper limit, reducing the maximum torque that can be output thereafter. The maximum torque can be increased by adjusting the current lead angle. The characteristic in which the maximum torque is increased by adjusting the current lead angle is indicated as a "conventional NT". In the present embodiment, a current including a component different from the fundamental component is applied as the zero-phase current to the motor to promote the magnetic saturation of the stator core to reduce the line voltage, allowing the line voltage to have a margin to the upper limit, thus increasing the torque as shown in a "torque increase region according to the embodiment".

In this manner, the present embodiment can increase the torque in the region in which the line voltage of the motor reaches the upper limit of the inverter DC power supply line (DC line).

Superimposition of Direct Current

Figure 5:
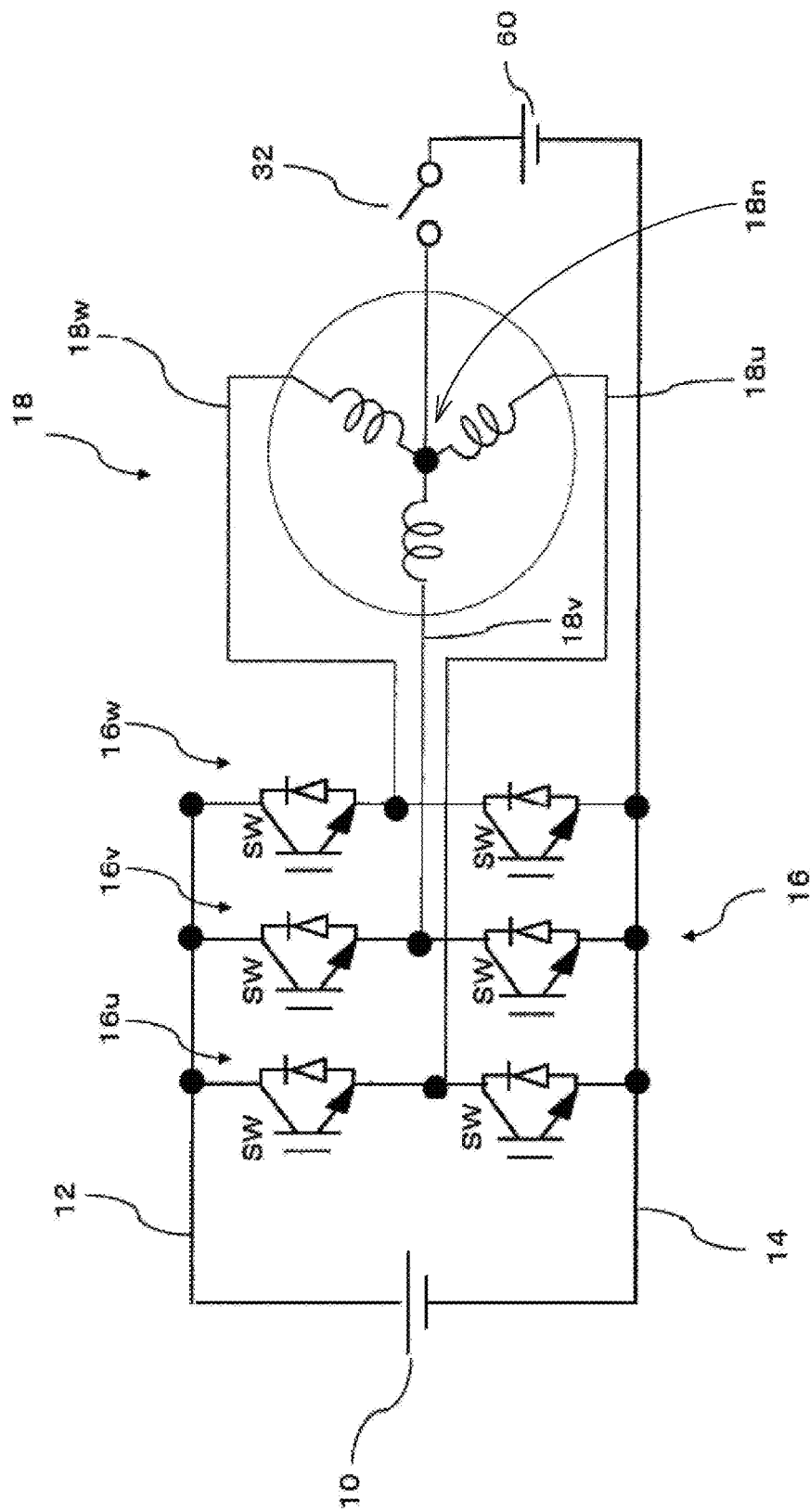
FIG. 5 is a diagram showing a configuration of the motor system in which a zero-phase current that is a direct current is supplied to the motor.

As described above, the zero-phase current may be a direct current. FIG. 5 is a diagram showing a configuration of the motor system in which a zero-phase current that is a direct current is supplied to the motor. In this example, a battery 60 is provided as the zero-phase current supply unit between the negative bus bar 14 and the neutral point 18*n*. Thus, a zero-phase current from the battery 60 is supplied to the neutral point of the motor 18. A switch 32 turns on or off the connection between the battery 60 and the neutral point. In FIG. 5, the control unit 30 and the like are not shown.

FIG. 6A is a diagram showing a waveform of the current, when a zero-phase current that is a direct current is superimposed on a drive current including only a fundamental component. FIG. 6B is a diagram showing a waveform of the number of flux linkages, when a zero-phase current that is a direct current is superimposed on a drive current including only a fundamental component. Thus, when the direct current is superimposed on the drive current, the waveform of the current is shifted according to the direct current component.

Figure 7A:
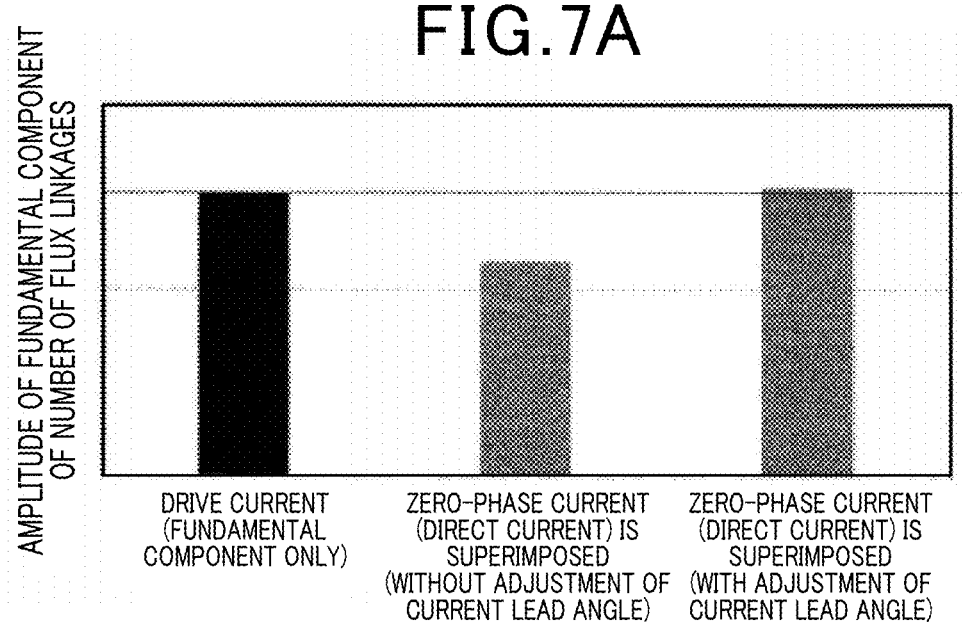
FIG. 7A is a diagram showing an amplitude of a fundamental component of the number of flux linkages, when a zero-phase current that is a direct current is superimposed on a drive current including only a fundamental component.
Figure 7B:
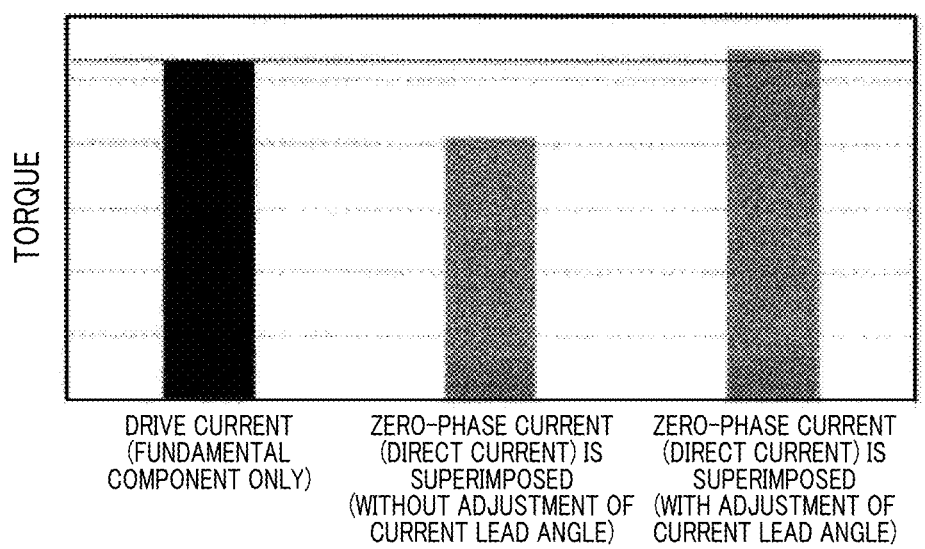
FIG. 7B is a diagram showing a torque, when a zero-phase current that is a direct current is superimposed on a drive current including only a fundamental component.

FIG. 7A is a diagram showing an amplitude of a fundamental component of the number of flux linkages, when a zero-phase current that is a direct current is superimposed on a drive current including only a fundamental component. FIG. 7B is a diagram showing a torque, when a zero-phase current that is a direct current is superimposed on a drive current including only a fundamental component. Thus, by superimposing the direct current on the drive current, the amplitude of the fundamental component of the number of flux linkages is reduced, allowing a margin to the upper limit of the inter-terminal voltage (hereinafter referred to as line voltage).

Therefore, when adjustment of the current lead angle of the fundamental current is performed, the amplitude of the fundamental component of the number of flux linkages for the drive current becomes equivalent to the amplitude of the fundamental component of the number of flux linkages for the fundamental current, thus further increasing the output torque.

As described above, in the present embodiment, when the line voltage of the motor reaches a voltage close to the upper limit, the zero-phase current that is a direct current is superimposed on the drive current. As in the case where the third harmonic current is superimposed on the fundamental current, this promotes the magnetic saturation of the stator core, increasing the magnetic reluctance of the stator core, thus making it difficult to pass a fundamental magnetic flux through the stator core. This reduces the fundamental component of the coil voltage, leading to a reduction in the line voltage of the motor, thus eliminating the need for field weakening. Furthermore, the torque can be increased by increasing the current lead angle to increase the fundamental magnetic flux until the line voltage reaches the upper limit. That is, the torque can be increased by increasing the current supplied from the inverter to the motor.

Promotion of Magnetic Saturation

Figure 8:
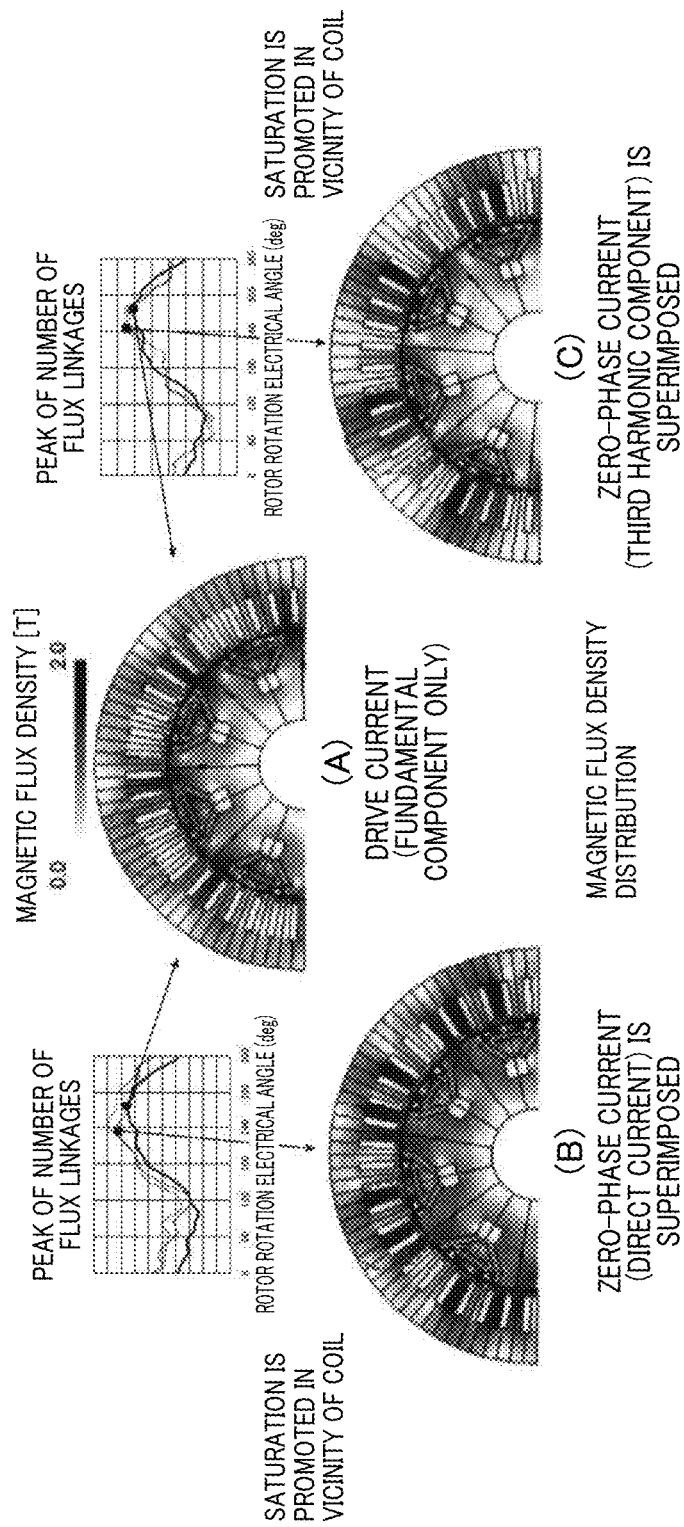
FIG. 8 is a diagram showing a magnetic flux density distribution at the peak of the number of flux linkages, in which (A) shows the case where a drive current (fundamental component only) is used, (B) shows the case where a zero-phase current (direct current) is superimposed on the drive current, and (C) shows the case where a zero-phase current (third harmonic component) is superimposed on the drive current.

FIG. 8 is a diagram showing a magnetic flux density distribution at the peak of the number of flux linkages, in which (A) shows the case where a drive current (fundamental component only) is used, (B) shows the case where a zero-phase current (direct current) is superimposed on the drive current, and (C) shows the case where a zero-phase current (third harmonic component) is superimposed on the drive current. Thus, as compared with the case where the drive current (fundamental component only) is used, in the case where the zero-phase current is superimposed on the drive current, the magnetic flux density of the stator core at the peak of the number of flux linkages is saturated in the vicinity of the coil (winding). By promoting the magnetic saturation of the stator core, the magnetic reluctance of the stator core is increased, thus making it difficult to pass a fundamental magnetic flux through the stator core. This allows the line voltage of the motor to have a margin to the upper limit of the input DC voltage of the inverter input from the DC power supply, thus increasing the torque.

Process Flow

Figure 9:
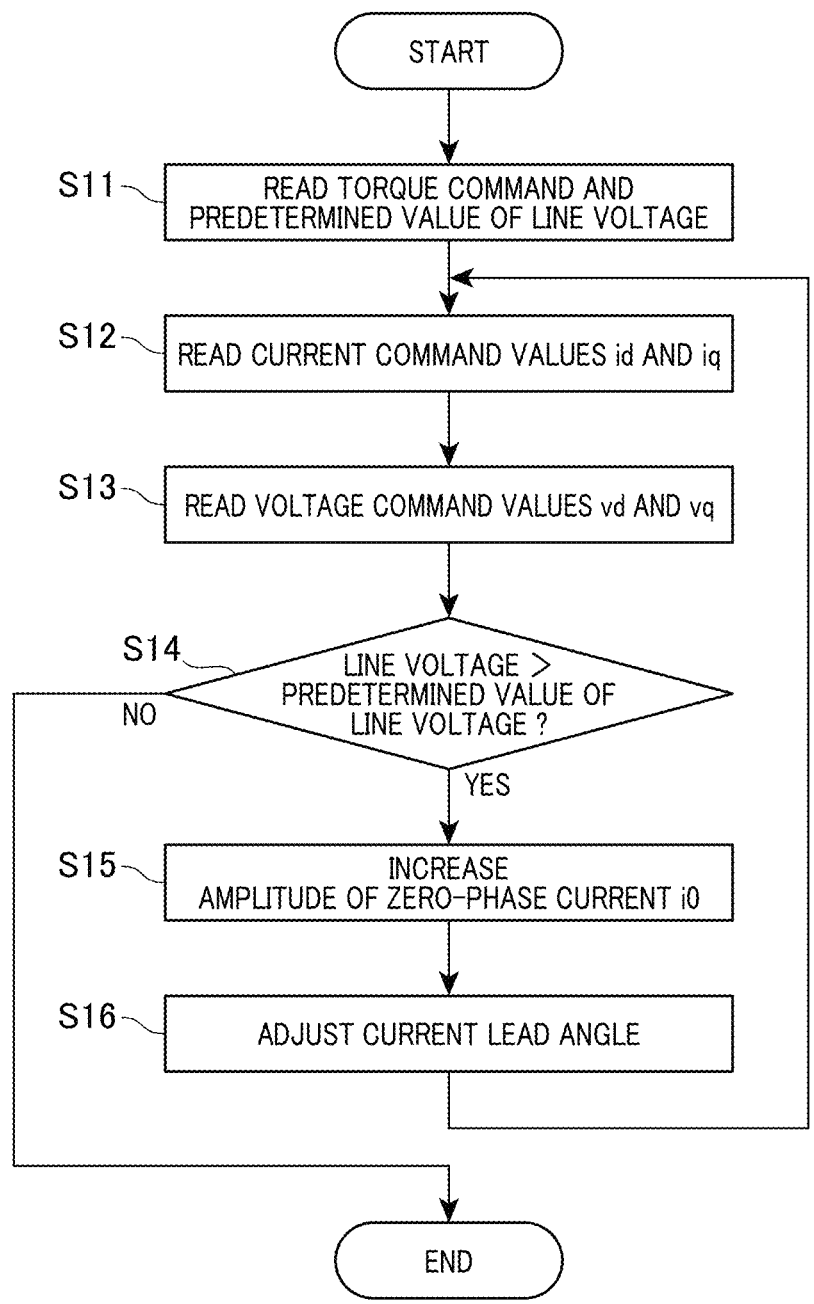
FIG. 9 is a flow chart showing a process of zero-phase current control.

FIG. 9 is a flow chart showing a process of zero-phase current control executed by the control unit 30 according to a program stored in the memory in advance.

First, a torque command and a predetermined value of the line voltage are read (process in S11). The predetermined value of the line voltage is a voltage corresponding to the upper limit of the line voltage of the motor, and may be set to a voltage lower than the actual upper limit. In the case where the motor system includes a DC/DC converter 40, it is possible to change the input voltage of the inverter input from the DC power supply, and this allows the predetermined value of the line voltage to be changed.

Next, current command values id and iq are read (process in S12). The current command values id and iq are respectively an excitation current command value and a torque current command value during vector control of the motor, and are obtained by calculation, for example, from the rotational phase and the rotational speed of the motor 18. Then, voltage command values vd and vq are read (process in S13). The voltage command values vd and vq are obtained from the current command values id and iq and the phase currents of the motor 18.

Next, voltage command values of the phases of the motor 18 are obtained based on the voltage command values vd and vq, and a line voltage is obtained based on the obtained voltage command values of the phases. Then, it is determined whether the obtained line voltage is higher than the predetermined value of the line voltage (process in S14). When a negative determination (NO) is made in this process, the inverter 16 is controlled according to the voltage command values of the phases to drive the motor 18.

On the other hand, when an affirmative determination (YES) is made in the process in S14, the amplitude of a zero-phase current i0 is increased (process in S15). At the first time, application of the zero-phase current i0 is started. Next, a current lead angle separately obtained by calculation is adjusted (process in S16). Then, control returns to the process in S12, and the current command values id and iq and the voltage command values vd and vq after adjustment of the zero-phase current i0 and the current lead angle are read (processes in S12 and S13), and the line voltage after adjustment is compared with the predetermined value of the line voltage (process in S14). Such adjustment is performed until a negative determination (NO) is made in the process in S14, and the line voltage is set to be the predetermined value or less, and then the process ends. The adjustment of the current lead angle in the process in S16 may be omitted. Furthermore, when an affirmative determination (YES) is made in the process in S14, the increase of the amplitude of the zero-phase current i0 in the process in S15 may be preferentially performed, or the adjustment of the current lead angle in the process in S16 may be preferentially performed.

Use of DC/DC Converter

Figure 10:
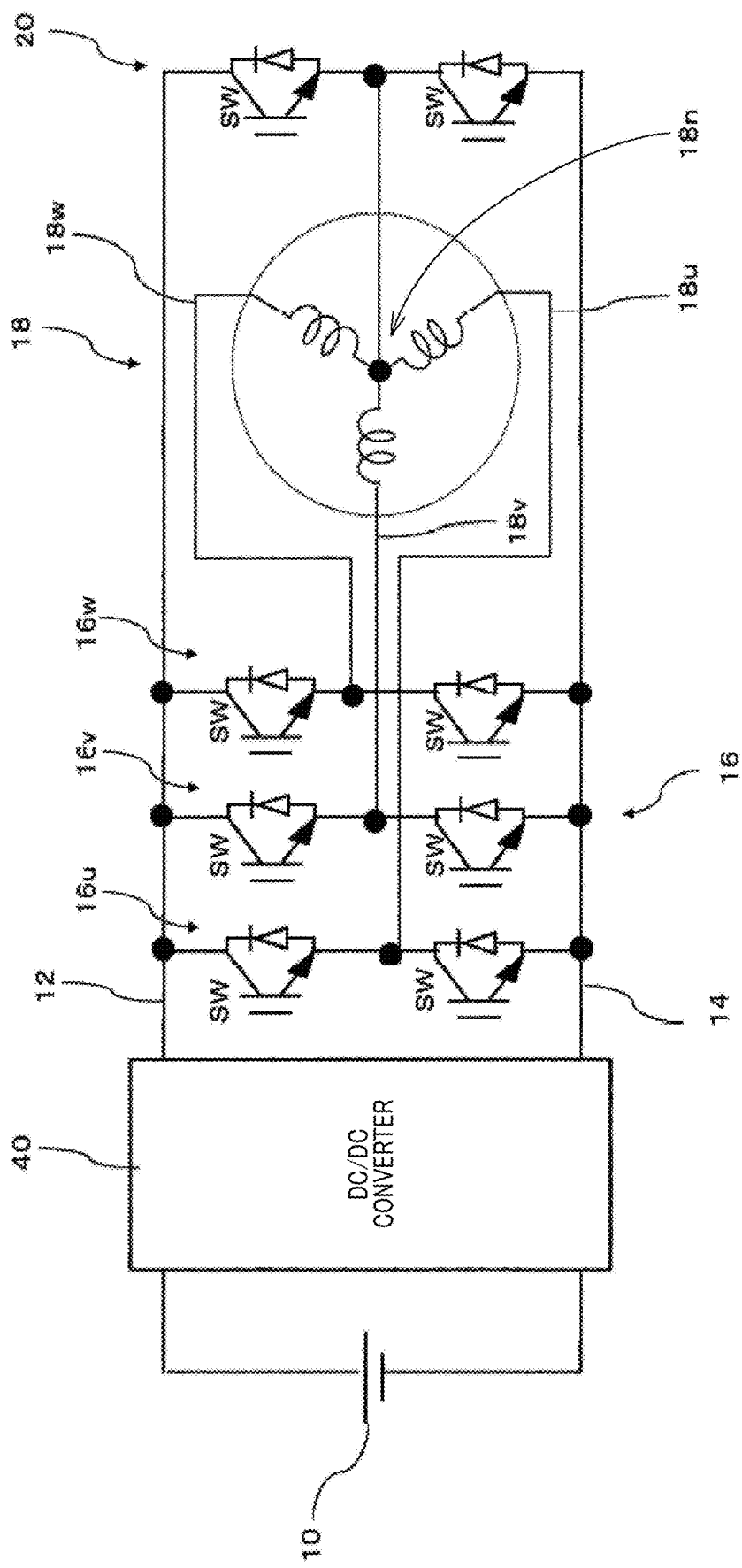
FIG. 10 is a diagram showing a configuration of the motor system in which a DC/DC converter is provided between a battery and an inverter.

FIG. 10 is a diagram showing a configuration obtained by providing, in the configuration shown in FIG. 1, the DC/DC converter 40 between the battery 10 and the inverter 16 as a power converter capable of adjusting a DC voltage. Thus, the voltage between the positive bus bar 12 and the negative bus bar 14 that is input to the inverter 16 is an output voltage of the DC/DC converter 40, and the output voltage can be adjusted by controlling the DC/DC converter 40. In this configuration, by increasing the voltage between the positive bus bar 12 and the negative bus bar 14 using the DC/DC converter 40, the predetermined value of the line voltage can be increased.

Configuration With Open Windings

Figure 11:
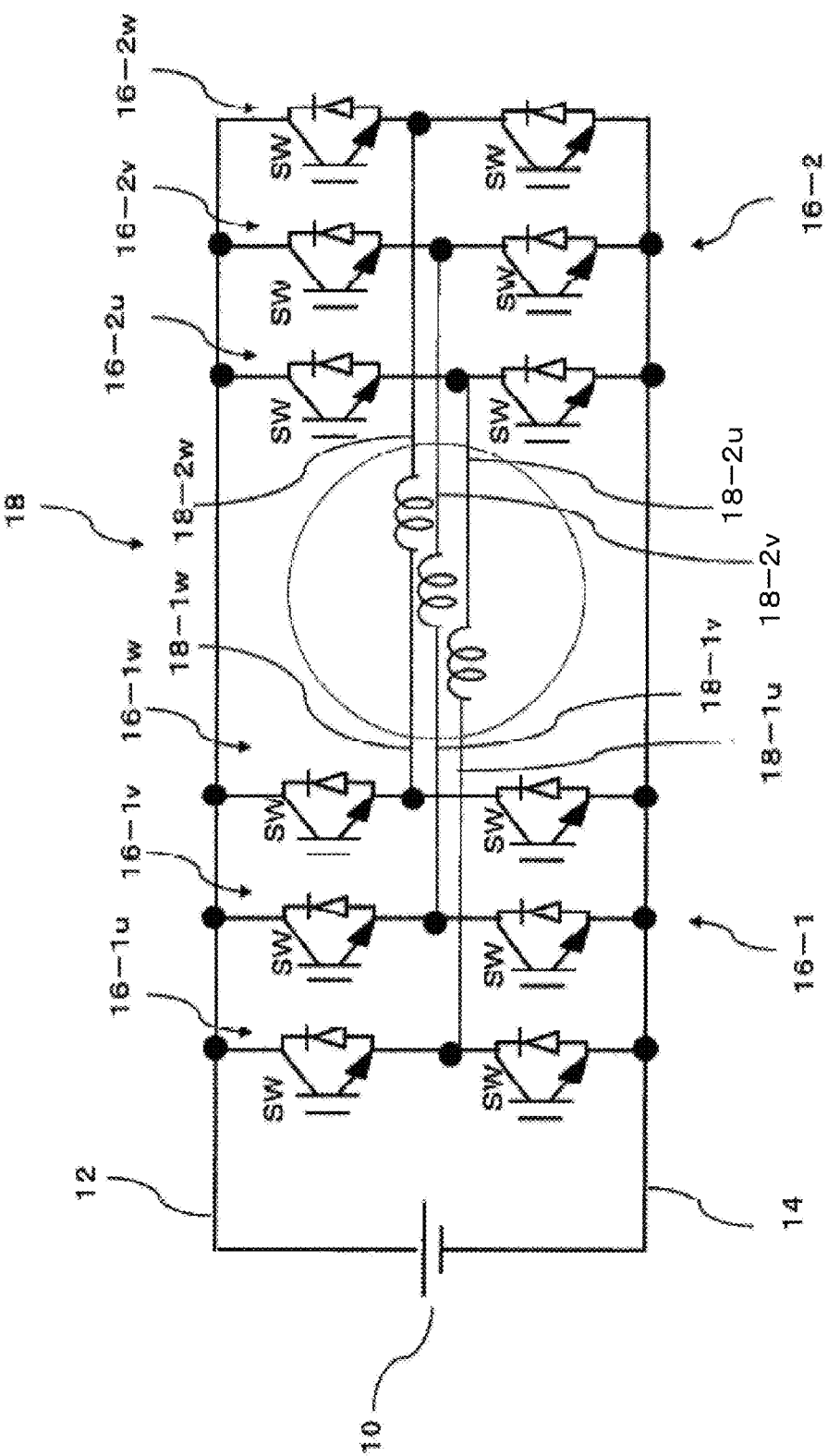
FIG. 11 is a diagram showing a configuration of the motor system in which a zero-phase current is superimposed on a drive current in an open-winding motor.

FIG. 11 is a diagram showing a configuration of the motor system in which a zero-phase current is superimposed on a drive current in an open-winding motor. Two inverters 16-1 and 16-2 are connected between the positive bus bar 12 and the negative bus bar 14 from the battery 10. The inverters 16-1 and 16-2 each have the same configuration as the inverter 16 described above, and the inverter 16-1 has three switching legs 16-1*u*, 16-1*v*, and 16-1*w*, and the inverter 16-2 has three switching legs 16-2*u*, 16-2*v*, and 16-2*w*. A U-phase winding of the motor 18 has a first wiring terminal 18-1*u* and a second wiring terminal 18-2*u*. The first wiring terminal 18-1*u* is connected to a midpoint of the switching leg 16-1*u* of the inverter 16-1. The second wiring terminal 18-2*u* is connected to a midpoint of the switching leg 16-2*u* of the inverter 16-2. A V-phase winding of the motor 18 has a first wiring terminal 18-1*v* and a second wiring terminal 18-2*v*. The first wiring terminal 18-1*v* is connected to a midpoint of the switching leg 16-1*v* of the inverter 16-1. The second wiring terminal 18-2*v* is connected to a midpoint of the switching leg 16-2*v* of the inverter 16-2. A W-phase winding of the motor 18 has a first wiring terminal 18-1*w* and a second wiring terminal 18-2*w*. The first wiring terminal 18-1*w* is connected to a midpoint of the switching leg 16-1*w* of the inverter 16-1. The second wiring terminal 18-2*w* is connected to a midpoint of the switching leg 16-2*w* of the inverter 16-2. Thus, by controlling switching of the switching elements SW of the switching legs of the phases of the two inverters 16-1 and 16-2, a desired current can be supplied to the phase windings of the motor 18. In general, in the motor 18, an alternating current symmetric with respect to zero passes through the phase windings so that the zero-phase current becomes zero (one of the currents flowing through the two inverters 16-1 and 16-2 is a source current, and the other current is a sink current). However, in the present embodiment, by adjusting the on/off state of the upper switching elements and the lower switching elements of the switching legs, the sum of the winding currents flowing through the three-phase windings is shifted from zero, allowing an arbitrary zero-phase current to pass through the motor 18. In this example, both the two inverters 16-1 and 16-2 function as the zero-phase current supply unit. Also in FIGS. 10 and 11, the control unit 30 and the like are not shown.

Others

The inverter 16 includes three-phase switching legs; however, the inverter 16 may include switching legs having another number of phases such as five phases. The motor system according to the embodiment is suitable, for example, for a system of a drive motor of an electric automobile or a hybrid automobile.

Effects of Embodiment

In the present embodiment, in the motor 18 capable of controlling a zero-phase current, when the line voltage reaches the predetermined value of the line voltage (the upper limit of the line voltage), a zero-phase current having a frequency different from that of the fundamental component of the drive current is input to promote the magnetic saturation of the stator, reducing the variation in the number of flux linkages. That is, the fundamental component of the drive current for driving the motor is reduced to allow a margin to the upper limit of the line voltage. Due to the margin, the current lead angle can be increased, thus increasing the output torque of the motor 18.

The present disclosure has been described in accordance with the embodiment. However, it is to be understood that the present disclosure is not limited to the embodiment and structures. The present disclosure includes various modifications and variations within the equivalent range. In addition, various combinations and forms, and other combinations and forms including only one element, more, or less, are within the scope and spirit of the present disclosure.

What is claimed is:

1. A motor system comprising:
a permanent magnet motor including a stator having N-phase windings and a rotor having a permanent magnet, N being a natural number greater than or equal to three;
an inverter that supplies N-phase drive currents for generating a rotating magnetic field to the N-phase windings of the stator to rotationally drive the motor; and
a zero-phase current supply that supplies a zero-phase current to the N-phase windings of the stator, wherein
the zero-phase current is applied to the N-phase windings to superimpose the zero-phase current on the N-phase drive currents in response to an inter-terminal voltage of the permanent magnet motor reaching a predetermined value during drive of the permanent magnet motor with the N-phase drive currents supplied to the N-phase windings of the stator, the inter-terminal voltage of the permanent magnet motor being a voltage between a pair of terminals of the N-phase windings, and
the zero-phase current is an Nth harmonic current with respect to a fundamental component of each of the drive currents.

2. The motor system according to claim 1, wherein
the N-phase windings of the stator have a Y-connection, and
the zero-phase current is supplied via a neutral point of the Y-connection.

3. The motor system according to claim 1, wherein
the N-phase windings of the stator are independent of each other,
the inverter includes a first inverter and a second inverter that are independent of each other,
the N-phase windings each have a first end and a second end,
an output terminal of the first inverter is connected to the first ends of the N-phase windings, and an output terminal of the second inverter is connected to the second ends of the N-phase windings, and
switching of the first inverter and the second inverter is controlled to pass the zero-phase current through the N-phase windings.

4. The motor system according to claim 1, wherein
the zero-phase current is applied to the N-phase windings to promote magnetic saturation of a stator core of the stator.

5. The motor system according to claim 1, wherein
the inverter further increases a fundamental current or adjusts a current lead angle.

6. The motor system according to claim 1, wherein
a DC voltage from a DC power supply is supplied to the inverter via a power converter.

7. A motor system comprising:
a permanent magnet motor including a stator having N-phase windings and a rotor having a permanent magnet, N being a natural number greater than or equal to three;
an inverter that supplies N-phase drive currents for generating a rotating magnetic field to the N-phase windings of the stator to rotationally drive the motor; and a zero-phase current supply that supplies a zero-phase current to the N-phase windings of the stator, wherein the zero-phase current is applied to the N-phase windings to superimpose the zero-phase current on the N-phase drive currents in response to an inter-terminal voltage of the permanent magnet motor reaching a predetermined value during drive of the permanent magnet motor with the N-phase drive currents supplied to the N-phase windings of the stator, the inter-terminal voltage of the permanent magnet motor being a voltage between a pair of terminals of the N-phase windings, the inverter includes N switching legs, and the zero-phase current supply includes a switching leg that is different from the N switching legs of the inverter.

8. The motor system according to claim 7, wherein the zero-phase current has a frequency different from a frequency of a fundamental component of the N-phase drive currents.

9. The motor system according to claim 7, wherein the N-phase windings of the stator have a Y-connection, and the zero-phase current is supplied via a neutral point of the Y-connection.

10. The motor system according to claim 7, wherein the N-phase windings of the stator are independent of each other, the inverter includes a first inverter and a second inverter that are independent of each other, the N-phase windings each have a first end and a second end, an output terminal of the first inverter is connected to the first ends of the N-phase windings, and an output terminal of the second inverter is connected to the second ends of the N-phase windings, and switching of the first inverter and the second inverter is controlled to pass the zero-phase current through the N-phase windings.

11. The motor system according to claim 7, wherein the zero-phase current is applied to the N-phase windings to promote magnetic saturation of a stator core of the stator.

12. The motor system according to claim 7, wherein the inverter further increases a fundamental current or adjusts a current lead angle.

13. The motor system according to claim 7, wherein the zero-phase current is an Nth harmonic current with respect to a fundamental component of each of the drive currents.

14. The motor system according to claim 7, wherein a DC voltage from a DC power supply is supplied to the inverter via a power converter.

* * * * *